UNITED STATES PATENT OFFICE.

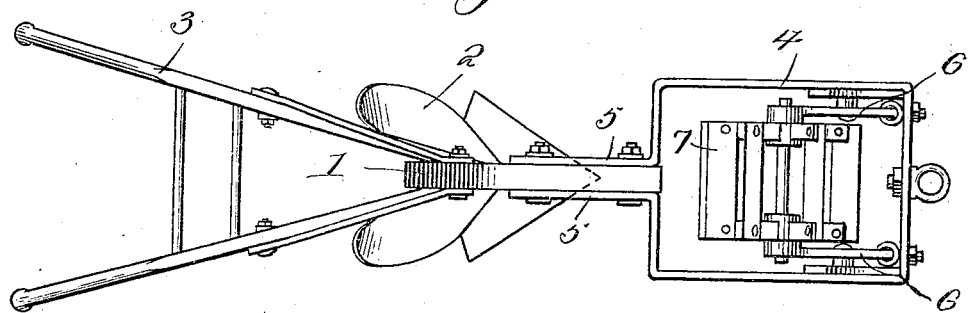
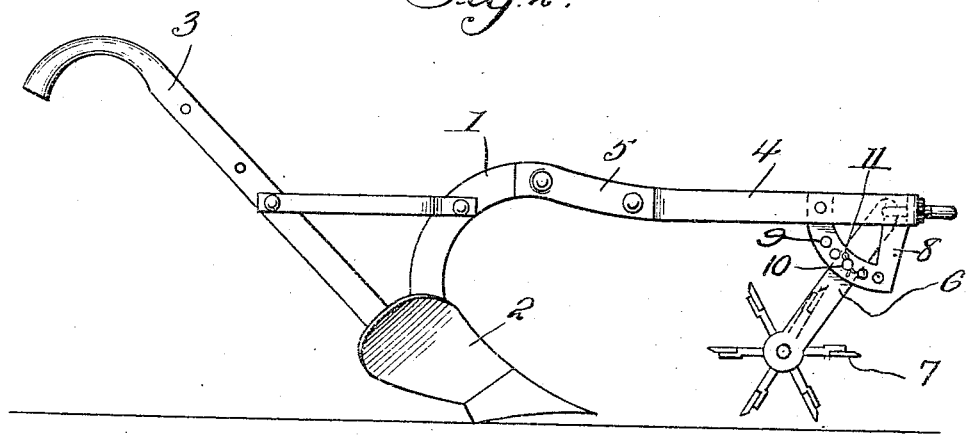

FRED S. KING, OF CHECOTAH, OKLAHOMA.

STALK-CUTTER.

1,297,182.  Specification of Letters Patent.  Patented Mar. 11, 1919.

Application filed August 14, 1918. Serial No. 249,845.

*To all whom it may concern:*

Be it known that I, FRED S. KING, a citizen of the United States, residing at Checotah, in the county of McIntosh and State of Oklahoma, have invented new and useful Improvements in Stalk-Cutters, of which the following is a specification.

This invention relates to stalk cutters and it consists in the novel features hereinafter described and claimed.

An object of the invention is to provide a stalk cutter in the form of an attachment adapted to be applied to the beam of a plow or cultivator and which may be used for cutting the stalks at the time that the soil is plowed or the crop cultivated.

With this object in view the cutter comprises a frame adapted to be applied to the beam of the plow or cultivator there being provided at the sides of the frame and at the forward end thereof pivoted standards which carry a rotary cutter between them. The standards may be swung to bring the cutter in contact with the soil or may be swung to elevate the cutter with relation to the surface of the soil.

In the accompanying drawing:—

Figure 1 is a top plan view of the stalk cutter.

Fig. 2 is a side elevation of the same.

The stalk cutter is adapted to be used in conjunction with the beam of a plow or cultivator and such beam is illustrated at 1 in the drawing. The beam 1 is preferably a short beam and may be made so by cutting a portion of the forward portion of the forward part of the usual beam from the rear part thereof. The beam 1 carries at its lower rear end a shovel 2 in a usual manner. Handles 3 are connected with the beam.

The stalk cutter comprises a frame 4 which is provided at its rear side with arms 5 and the said arms are secured to the sides of the beams 1 in any suitable manner. The frame 4 is provided with an open center. Standards 6 are pivotally mounted at the forward portion of the frame 4 and at the sides thereof and a cutter 7 is journaled for rotation between the free ends of the said standards. The cutter 7 may be of conventional form that is it may consist of a series of arms radiating from the shaft which is journaled in the standards and the said arms carry cutting blades in the usual manner. When the standards 6 are swung to vertical position the cutter is brought in contact with the surface of the soil. When the standards 6 are swung to horizontal position the cutter 7 is elevated above the surface of the soil. When the cutter is at its lowered position and as the implement moves over the soil the blades of the cutter will encounter the stalks and cut them into sections and the plow 2 following behind the cutter will cover the said sections of the stalks under the soil. Each of the standards 6 has an opening therethrough, and the sides of the frame, at the forward ends thereof are provided with depending brackets 8, each of the said brackets having a series of openings 9 arranged concentric of the pivotal connection of the standards with the frame. Through one of the openings 9 in each of the brackets 8 and through the openings in the standards 6 are adapted to pass locking pins 10 that may be secured by cotter pins 11 which pass transversely therethrough. By this arrangement the cutter may be held adjusted at different desired angles with respect to the frame and with respect to the surface on which the cutter operates.

From the foregoing description taken in conjunction with the accompanying drawing, it will be seen that a stalk cutter of simple and durable structure is provided and that the same may be used to advantage upon a plow or cultivator for cutting the stalks at the time that the soil is turned or cultivated.

Having described the invention what is claimed is:—

A stalk cutter for plows, comprising a rectangular frame having its inner end split and provided at the edges of the said split portion with parallel longitudinally extending arms designed to be arranged upon the opposite sides of a plow beam and to be secured thereto, standards hingedly connected to the forward end of the frame between the sides thereof, a cutter, a shaft therefor journaled in the lower ends of the standards, arched brackets secured to the sides at the forward end of the frame, each of said brackets having a series of concentrically arranged openings therethrough, each of the standards having a single opening designed to register with the openings in the said brackets, and a removable element passing through one of the openings in each of the brackets and through the openings in the standards for adjustably sustaining the standards and cutter with respect to the frame.

In testimony whereof I affix my signature.

FRED S. KING.

Copies of this patent may be obtained for five cents each, by addressing the "Commissioner of Patents, Washington, D. C."